3,470,055
EXTRUSION COATING METHOD
Charles A. Wade, Greenup, Ill., assignor to National Distillers and Chemical Corporation, New York, N.Y., a corporation of Virginia
Filed Jan. 21, 1965, Ser. No. 426,733
Int. Cl. B29c 13/00
U.S. Cl. 156—244                                                13 Claims

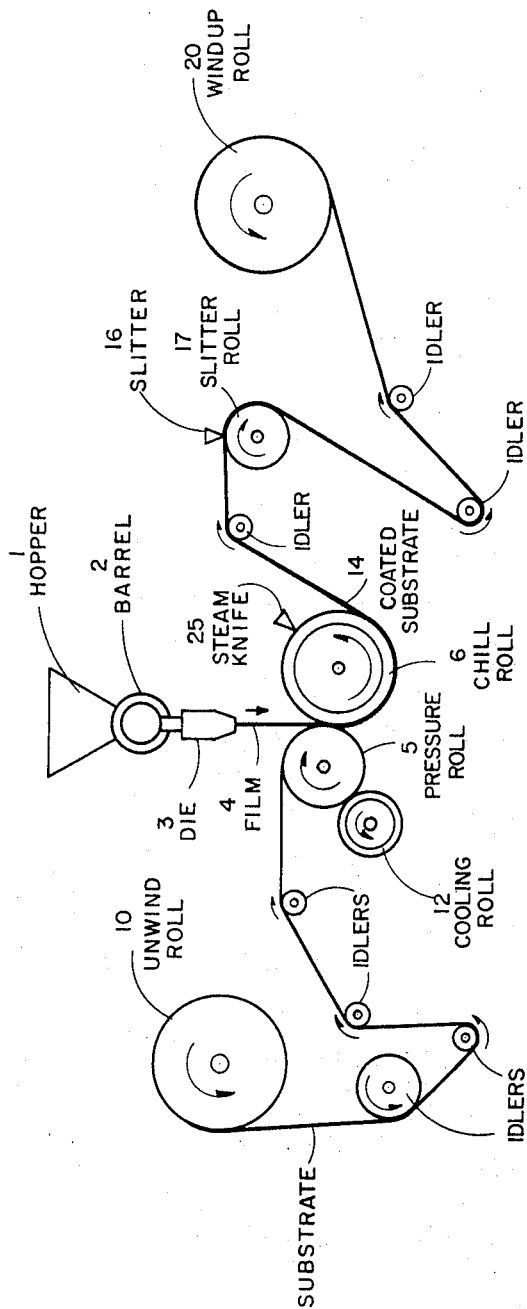

ABSTRACT OF THE DISCLOSURE

A method for providing an extruded polymeric resin coating on a substrate whereby the polymeric film is extruded in its molten state into the nip formed between two counter-rotating rolls wherein it is coated and pressed onto the substrate and wherein at least the roll contacting the polymeric coating is a chill roll, and recovering the resulting coated substrate by stripping it from the chill roll which is facilitated by applying a substantially uniform, thin film of moisture to the surface of said chill roll at a point prior to the formation of said nip and subsequent to the release therefrom and at a point subsequent to the release of previously formed polymeric coated substrate from the chill roll.

---

The present invention pertains to an improved extrusion coating method utilizing polyolefinic resins. More particularly, the invention pertains to an improved polyethylene extrusion coating method.

In recent years polyolefins such as polyethylene have been applied to a variety of substrates by the extrusion coating technique to produce a wide range of new packaging and other materials. Polyethylene, for example, is now being coated on paper, paper board, kraft paper, and glassine; cellophane, polyester film and other plastic films; metal foil; cloth; glass fiber; and other substrates. One of the main reasons for coating a substrate with polyethylene is to combine the best properties of the two materials. A polyethylene coating will contribute a heat-sealable surface, increased tear and crease resistance, and an excellent barrier against grease, oil and moisture. Such polyethylene coated substrates are useful for producing bags, pouches, cartons, liners for cartons and fiber drums, construction materials, etc.

For purposes of convenience the invention will be described hereinafter in terms of polyethylene having a density of about 0.910 to 0.940 as the preferred coating polymer, although it will be understood that monoolefinic copolymers, polypropylene, and the like may be readily employed with equally outstanding results.

In general, the substrate is coated with the polyethylene by extruding a thin film of molten resin and pressing it onto or into the substrate. Coating thicknesses may vary over a wide range such as ¼ mil or less to more than 4 mils. The usual coating process involves extruding the polyethylene through a long slit die, which is positioned just over and between two rolls. The particular substrate being employed is carried from an unwind or feed roll and is fed between the two rolls under the die as the polyethylene is extruded through the die. The combination of substrate and polyethylene is formed by pressure between the two rolls. One or both of the rolls immediately under the die may also function as cooling or chill roll(s) or the extrusion coated material may be passed to a separate chill roll from which it goes to the winding apparatus. In present day commercial operations the high output extrusion coating equipment utilizes high speed rolls and high extrusion temperatures. Such equipment has tended to cause adhesion of the extrusion coated material to the chill roll. The adhesion of the resin to the roll may cause surface imperfections as well as more severe problems involving separation of the resin from the substrate or interfiber separation within the substrate.

The adhesion problem has been recognized in the art and there have been previous attempts to overcome it by incorporating special additive materials into the polymeric resin. The added costs plus the uncertainty arising from the effect of these additives on the properties of the film product has led to the search for other means for solving this problem.

One object of the present invention is to provide an improved extrusion coating method which avoids the chill roll adhesion problems encountered in the prior art methods.

Another object of the present invention is to provide a method for overcoming the chill roll adhesion problem without the use of special additive materials in the polymeric resin.

These and other objects of the present invention will become readily apparent from the ensuing description and illustrative embodiments.

In accordance with the present invention it has now been found that the chill roll adhesion problem encountered in extrusion coating operations can be avoided by condensing a very thin film of moisture on the surface of the chill roll as it rotates. When this method is employed, excellent release is obtained and there was no sticking and no crackling noise which were often encountered when utilizing the conventional extrusion coating procedures. The thin film of moisture may be applied to the chill roll by a variety of techniques. It is possible, for example, to blow humid air such as steam, steam-air mixtures, and the like directly onto the surface of the chill roll prior to its passage under the die and contact with the nip or pressure roll. The humid air can be blown onto the surface of the chill roll by means of a steam hose or a steam knife. In general, it is preferred only to employ only a sufficient amount of humid air so as to cloud the chill roll surface with moisture. Another technique which has been successfully employed involves contacting the surface of the chill roll between the point of coated substrate release and the extrusion die with wet rags. The use of a steam-air knife is preferred, since it permits better control over the amount of moisture applied and ensures a substantially uniform distribution of the moisture. However, it should be understood that other techniques and equipment for coating the surface of the chill roll with a very thin film of moisture may also be employed. These techniques and equipment include spraying and the use of squeegee rolls or blades.

The method of this invention will be further understood by reference to the accompanying drawing, which is a schematic cross section of a typical coating setup utilizing the method of this invention.

In the drawing, polyethylene resin pellets supplied through hopper 1 are first melted by being subjected to heat and pressure inside barrel 2 of an extruder. The molten polyethylene is then forced by a screw (not shown) through the narrow slit of the extrusion coating die 3. The slit is straight line-shaped and the emerging film 4 has the form of a thin sheet. Upon leaving die 3 the molten film 4 is drawn down into the nip between rolls 5 and 6. Roll 5 is a rubber-covered pressure roll, whereas roll 6 is a driven, water-cooled chill roll.

The substrate to be coated is supplied from unwind roll 10 via a series of idler rolls to pressure roll 5. In the nip between rolls 5 and 6 the hot film 4 is drawn down to the prescribed thickness or gauge and forced onto the substrate when both layers are forced together by the two rolls. The pressure is generally between 30 to 120, preferably about 70 to 80 lbs. per linear inch, although greater or lower pressures may be utilized, if deemed necessary. The combination of substrate and polyethylene is then rapidly cooled by chill roll 6, maintained at temperatures such as in the range of 75 to 85° F., which is internally cooled by procedures which are conventional in this art. As shown in the drawing, pressure roll 5 is cooled by utilizing cooling roll 12, which is also internally cooled.

The resulting coated substrate 14 passed from chill roll 6 via an idler roll to a conventional slitting operation, which is illustrated by slitter 16 and slitter roll 17. Following slitting, the coated substrate is passed via a series of idler rolls to windup roll 20.

In accordance with the method of this invention, an air-stream knife 25 is positioned in cose proximity to chill roll 6 just prior to the nip formed between chill roll 6 and pressure roll 5. A predetermined mixture of air and steam is blown onto the surface of chill roll 6 to provide a substantially uniform thin layer of moisture. Excellent chill roll release was obtained in contrast to extrusion coating operations carried out in absence of this particular treatment of chill roll.

Although the invention has been described above in connection with a particular arrangement of extrusion coating equipment, it will be understood that other arrangements utilizing a chill roll may also be improved by practising the method of this invention. As previously indicated, the use of an admixture of steam and air is preferred to furnish the very thin layer or film of moisture on the surface of the chill roll; steam alone or equipment other than an air knife may be readily employed. When utilizing an admixture of steam and air the volume ratio will range from about 1/9 to 9/1, and preferably about 1/4 to 4/1.

The broad scope of this invention permits the use of various thermoplastic materials as well as polyethylene to form the coating film. Conventional additives such as anti-oxidants, slip, anti-block and other agents may be incorporated in the feed polymeric resins without encountering any deleterious results. It will be understood, however, that the method of this invention as aforedescribed eliminates the need to employ special additives or other procedures to ensure that chill roll release will be readily accomplished under the high speed and elevated temperature conditions now commercially practiced in the extrusion coating industry.

As also described above only a very thin film or layer of moisture need be applied to the surface of the chill roll to attain the desired chill roll release results. Although the thickness or gauge of this film of moisture is not critical, it is generally preferred to avoid excessive condensation on the surface of the chill roll to avoid any possibility of deleteriously affecting the surface appearance of the film. In general, the thickness of the film of moisture required is monomolecular.

In general it is preferred to employ a chill roll or drum having a smooth metal surface and highly polished chrome plated rolls have been found to be particularly suitable. However, rolls made of other materials such as rolls having a surface of smooth, highly polished steel, aluminum, etc. may also be used. With respect to the pressure roll, the surface thereof should comprise a material that possesses resiliency characteristics and, for example, materials such as silicone rubber, neoprene, natural rubber, Teflon, fibers, etc. may be used.

The present invention will be further explained by the following illustrative embodiments, which are intended for purposes of illustration and are not intended to be construed as limitations.

EXAMPLE I

The equipment shown in the drawing was utilized with the exception that the air knife was omitted and instead the surface of the chill roll was contacted with wet rags to apply a very thin film of moisture to the surface of the chill roll just prior to its passage under the extruder die. 40-pound wet strength kraft paper was coataed with a film of polyethylene prepared from a resin having a density of 0.9235 and a melt index of 3.0. Excellent chill roll release was obtained in contrast to a similar run carried out in the absence of a very thin film of moisture on the chill roll where sticking and cracking noises were encountered. Moreover, release from the chill roll was obtained at a point on the chill roll which was below release points previously observed utilizing conventional extrusion coating operations.

EXAMPLE II

The extrusion coating operation of Example I was employed using a 50-pound natural kraft paper and a steam hose provided with a 65-pound steam feed in place of the wet rags. The flow of steam is directed in such a manner as to cloud the surface of the chill roll with moisture just prior to its passage under the extruder die and the formation of the nip between the chill roll and the pressure roll. Excellent release of the polyethylene-coated kraft paper was obtained as it was pulled from the chill roll on the top idler roll or release side.

EXAMPLE III

Instead of the steam hose utilized in Example II a steam knife was positioned over the chill roll to provide a substantially uniform, thin film of moisture on the surface of the roll just prior to its passage under the extruder die. The steam knife was a metal box having the dimensions 2 inches wide, 2 inches high, and 5 feet long. One side of the metal box is slit to permit passage of the steam onto the surface of the chill roll. In order to prevent excessive steam from condensing in the knife and being blown onto the chill roll surface, the steam feed was admixed with compressed air in a mixing chamber attached to the knife. The volume ratio of steam to air was about 2 to 3. An even distribution of moisture was condensed on the surface of the chill roll by blowing the steam-air mixture through the slit in the knife. During the actual extrusion coating operation utilizing the polyethylene resin and the kraft paper of Example II, excellent chill roll release was obtained. When the same extrusion coating operation was performed in the absence of the thin film of moisture on the chill roll surface, deleterious chill roll release problems were encountered.

Additional runs were carried out using varying coating weights of the polyethylene resin with and without the steam knife to determine the effect of the chill roll surface condensation on the appearance of the coated substrate. No difference in appearance between the comparative samples could be detected.

While particular embodiments of the invention are shown above, it will be understood that the invention is obviously subject to variations and modifications without departing from its broader aspects. It is possible, for example, to employ analogous polymer and substrate materials as well as other extrusion coating apparatus and operating conditions.

What is claimed is:

1. In an extrusion coating method wherein the film of polymeric resin is coated on a substrate by extruding said polymeric film downwardly in its molten state into the nip formed between two counter-rotating rolls wherein it is coated and pressed onto said substrate, wherein at least the roll contacting the polymeric coating is a chill roll, and recovering the resulting coated substrate by stripping it from the chill roll; the improvement which comprises applying a substantially uniform, thin film of moisture to the surface of said chill roll at a point prior to the formation of said nip and subsequent to the release therefrom and at a point subsequent to the release of previously formed polymeric coated substrate from the chill roll.

2. The method of claim 1 wherein said polymeric resin is polyolefin.

3. The method of claim 1 wherein said polymeric resin is polyethylene.

4. The method of claim 1 wherein said substrate is paper.

5. The method of claim 4 wherein said substrate is kraft paper.

6. The method of claim 1 wherein said substrate is paper board.

7. An improved method for extrusion coating a thermoplastic polymeric resin onto a substrate which comprises extruding said polymeric resin as a molten film downwardly into the nip formed between two counter-rotating rolls wherein it is coated and pressed onto said substrate, wherein at least the rotating roll contacting the exposed surface of the polymeric resin coating is a chill roll, blowing humid air onto the surface of the chill roll to form a substantially uniform, thin film of moisture thereon at a point prior to the formation of said nip and subsequent to the release of said coated substrate from the chill roll, and recovering said coated substrate from the chill roll.

8. The method of claim 7 wherein said thermoplastic polymeric resin is polyethylene.

9. The method of claim 6 wherein said substrate is paper.

10. The method of claim 7 wherein the thickness of said film of moisture is monomolecular.

11. The method of claim 7 wherein said humid air is steam.

12. The method of claim 11 wherein said steam is admixed with compressed air.

13. The method of claim 12 wherein said steam and air admixture is present in a volume ratio of about 1/4 to 4/1.

References Cited

UNITED STATES PATENTS

| | | | |
|---|---|---|---|
| 2,119,702 | 6/1938 | Carroll | 264—213 |
| 3,017,302 | 1/1962 | Hultkrans | 156—244 X |
| 3,090,076 | 5/1963 | Corbett | 18—15 |
| 3,215,578 | 11/1965 | Craver | 156—244 |
| 3,323,965 | 6/1967 | Hanle et al. | 156—244 |

EARL M. BERGERT, Primary Examiner

T. R. SAVOIE, Assistant Examiner

U.S. Cl. X.R.

156—500; 264—176